US007086084B2

(12) United States Patent
Kappel et al.

(10) Patent No.: US 7,086,084 B2
(45) Date of Patent: Aug. 1, 2006

(54) SYSTEM AND METHOD FOR LOGINS

(75) Inventors: Jochen Kappel, Vence (FR); Josef Markgraf, Goldbach (DE); Michael Meadows, Sundbyberg (SE)

(73) Assignee: Schlumbergersema Telekom GmbH & Co. KG (DE)

( * ) Notice: Subject to any disclaimer, the term of this patent is extended or adjusted under 35 U.S.C. 154(b) by 670 days.

(21) Appl. No.: 09/825,151

(22) Filed: Apr. 2, 2001

(65) Prior Publication Data

US 2003/0070097 A1 Apr. 10, 2003

Related U.S. Application Data

(60) Provisional application No. 60/193,422, filed on Mar. 31, 2000.

(30) Foreign Application Priority Data

Mar. 31, 2000 (EP) ................... 00106948

(51) Int. Cl.
*G06F 7/04* (2006.01)
*G06F 17/60* (2006.01)
*H04M 15/00* (2006.01)

(52) U.S. Cl. ................ 726/4; 726/8; 726/21
(58) Field of Classification Search ................ 713/201, 713/202, 183, 184; 709/229; 726/4, 8, 21
See application file for complete search history.

(56) References Cited

U.S. PATENT DOCUMENTS 6,192,361 B1* 2/2001 Huang .................. 713/201

6,751,658 B1* 6/2004 Haun et al. ............... 709/222
6,772,157 B1* 8/2004 Barnett et al. ........... 713/201

FOREIGN PATENT DOCUMENTS

WO      WO 00 07128 A      2/2000

OTHER PUBLICATIONS

Kevin Cox and William Jones, "Administrating Users and Security", 29th Street Press, Jul. 1997, pp. 1-14.*
Boyd: Customer Billing Technology and Issues—Annual Review of Communications International Engineering Consortium, Bd. 47, 1994, Seiten 800-806, XP000455398, Chicago, IL, US.
Kleissner: Enterprise Objects Framework—Sigmod Record, Bd. 24, Nr. 2, Jun. 1, 1995, Seiten 455-459, XP002047857, New York, NY, US.

* cited by examiner

*Primary Examiner*—Matthew Smithers
*Assistant Examiner*—Courtney Fields
(74) *Attorney, Agent, or Firm*—Dority & Manning, P.A.

(57) ABSTRACT

The present invention provides a system and method for securing login to a system. In architecture, the system includes an identifier that identifies a user to login, and a validator that validates the user access privileges. An entry mechanism allows the user to enter the system if the user access privileges are valid. The present invention can also be viewed as a method for securing login to a system. The method operates by identifying a user to login, and validating the user access privileges. The user is allowed to enter the system if the user access privileges are valid.

8 Claims, 4 Drawing Sheets

SYSTEM AND METHOD FOR LOGINS

CLAIM OF PRIORITY AND CROSS REFERENCE TO RELATED APPLICATIONS

This application claims the benefit of U.S. Provisional Patent Application entitled "Targys System," filed Mar. 31, 2000 and having Ser. No. 60/193,422, and copending U.S. Utility patent application Ser. No. 09/819,446 entitled, "Customer Care and Billing System," filed on Mar. 28, 2001, which also claims priority to European Patent Application No. 00106948.3-2201, entitled "Customer Care and Billing System," filed Mar. 31, 2000, all of the foregoing of which are now pending and are incorporated herein by reference.

1. Field of the Invention

The present invention generally relates to computers and computer software, and more particularly, to a system and method for logging in to a system.

2. Description of Related Art

Typically, today's computing and networking environments are complex and geographically distributed, and in the future they will be even more so. However, as the computer and networking environments become more sophisticated, so do the unauthorized users. Generally, today, the biggest threat to any system is from unauthorized access from an inside or outside party. However, in a drive to become more secure, there is the competing virtue that the security for any system must be simple for authorized users to utilize. If a security system is too complex, authorized users will look for ways to simplify the process, which could put any system in a compromising position.

Thus, a heretofore-unaddressed need exists in the industry to address the aforementioned and/or other deficiencies and inadequacies.

SUMMARY OF THE INVENTION

The present invention provides a system and method for securing login to a system. In architecture, the system includes an identifier that identifies a user to login, and a valadator that validates the user access privileges. An entry mechanism allows the user to enter the system if the user access privileges are valid.

The present invention can also be viewed as providing a method for securing login to a system. In this regard, the preferred method can be broadly summarized by the following steps. The method operates by (1) identifying a user to login; (2) validating the user access privileges, and (3) allowing the user to enter the system if the user access privileges are valid.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The accompanying drawings incorporated in and forming a part of the specification illustrate several aspects of the present invention, and together with the description, serve to explain the principles of the invention. Moreover, in the drawings, like reference numerals designate corresponding parts throughout the several views. In the drawings.

DETAILED DESCRIPTION OF THE PREFERRED EMBODIMENT

Figure 1:
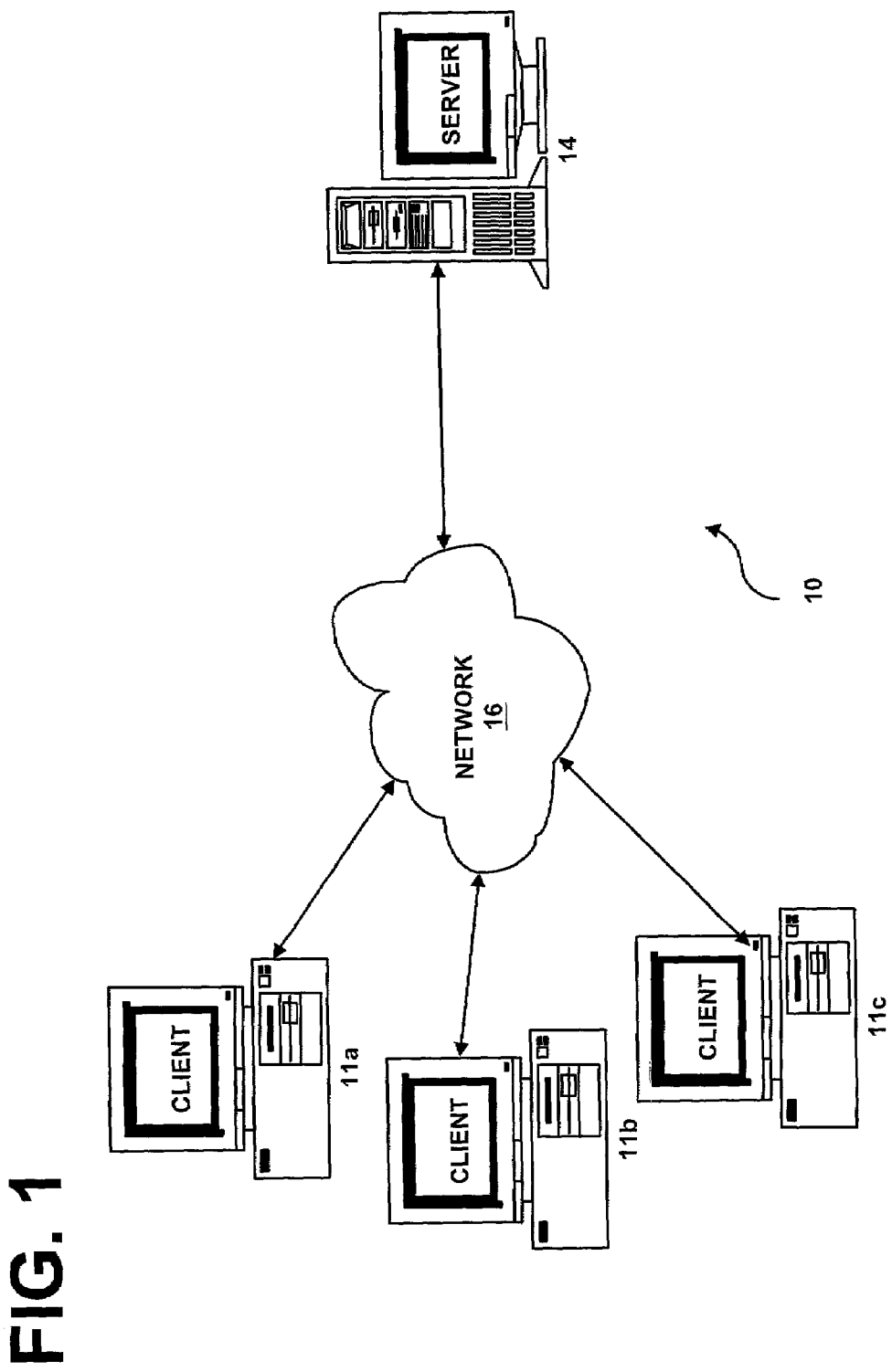
FIG. 1 is a block diagram illustrating an example of a network in which the login system may be implemented.

Reference will now be made in detail to the description of the invention as illustrated in the drawings. While the invention will be described in connection with is these drawings, there is no intent to limit it to the embodiment or embodiments disclosed therein. On the contrary, the intent is to cover all alternatives, modifications, and equivalents included within the spirit and scope of the invention as defined by the appended claims.

Referring now to the drawings, wherein like reference numerals designate corresponding parts throughout the drawings, FIG. 1 is a block diagram that portrays a diagram of a network that illustrates the flexibility, expandability, and platform independence in which the Login system of the present invention may be implemented. Referring to FIG. 1, a series of client computers 11a, 11b, 11c are connected to a server computer 14 via a network 16. The network 16 may be, for example, but is not limited to, a dial-in network, local area network (LAN), wide area network (WAN), public switched telephone network (PSTN), Intranet, Internet, Ethernet type networks, and the like. The client computers 11a, 11b, 11c (hereinafter, 11) may be located within a LAN, WAN, PSTN, Intranet, Internet, Ethernet type networks, or the like. It should be noted that the number of client computers and server computers may differ from the number presently illustrated. Further, it should also be noted that, that the preferred embodiment of the invention describes the functionality provided by a server computer 14.

Figure 2:
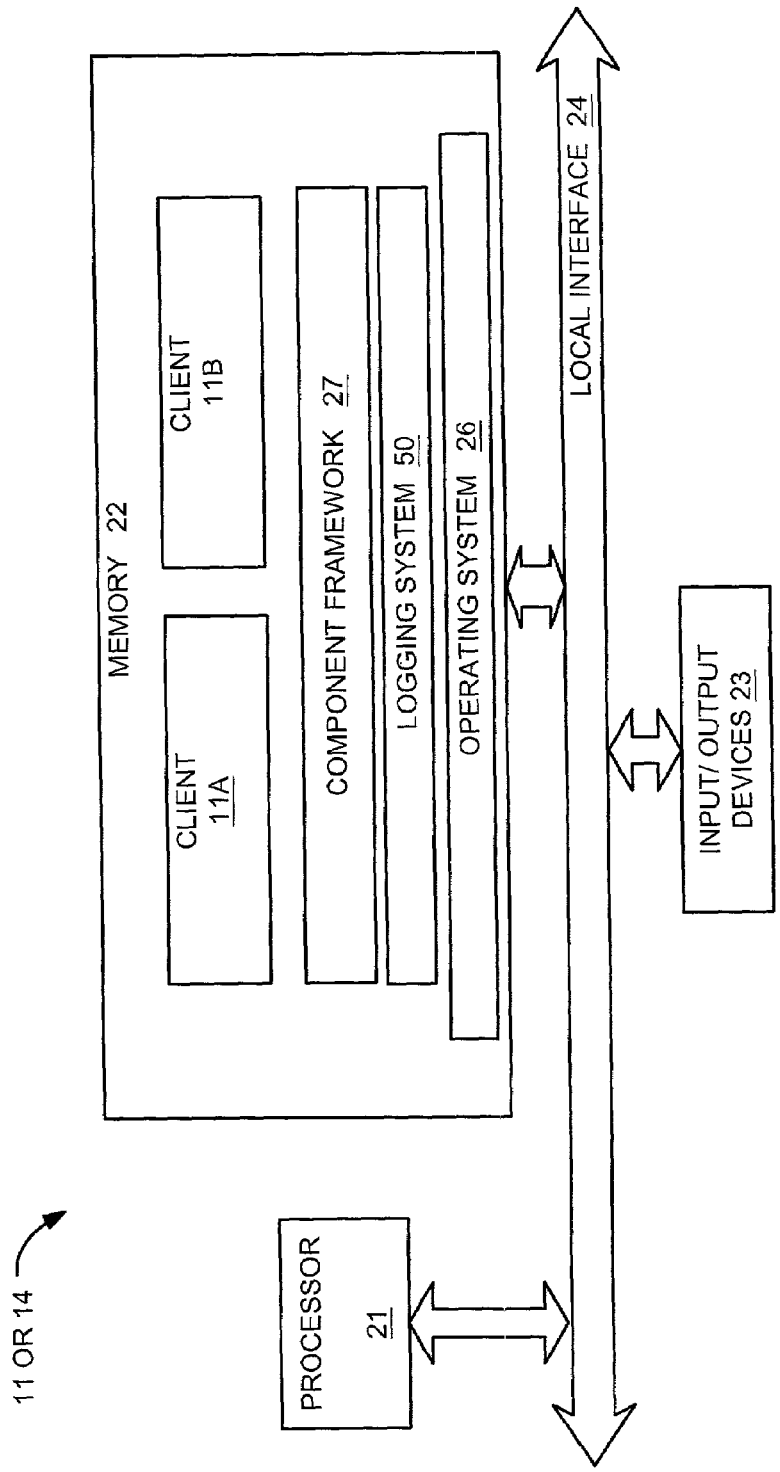
FIG. 2 is a block diagram illustrating an example of a computer system utilizing an operating system and login system of the present invention.

An example of a general-purpose computer that can implement the login system 50 of the present invention is shown in FIG. 2. The Login system 50 of the invention can be implemented in software (e.g., firmware), hardware, or a combination thereof. In one embodiment, the Login system 50 is implemented in software, as an executable program, and is executed by a special or general purpose digital computer, such as a personal computer (PC; IBM-compatible, Apple-compatible, or otherwise), workstation, minicomputer, personal digital assistant (PDA) or mainframe computer.

Generally, in terms of hardware architecture, as shown in FIG. 2, the computers 11 or 31 include a processor 21, memory 22, and one or more input and/or output (I/O) devices 23 (or peripherals) that are communicatively coupled via a local interface 24. The local interface 24 can be, for example but not limited to, one or more buses or other wired or wireless connections, as is known in the art. The local interface 24 may have additional elements, which are omitted for simplicity, such as controllers, buffers (caches), drivers, repeaters, and receivers, to enable communications. Further, the local interface 24 may include address, control, and/or data connections to enable appropriate communications among the aforementioned components.

The processor 21 is a hardware device for executing software that can be stored in memory 22. The processor 21 can be virtually any custom made or commercially available processor, a central processing unit (CPU) or an auxiliary processor among several processors associated with the computer 11 and/or 14, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 22 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 22 may incorporate electronic, magnetic, optical, and/or other types of storage media. Note that the memory 22 can have a distributed architecture, where various components are situated remote from one another, but can be accessed by the processor 21.

The software in memory 22 may include one or more separate programs, each of which comprises an ordered listing of executable instructions for implementing logical functions. In the example of FIG. 2, the software in the memory 22 includes the Login system 50 and a suitable operating system (O/S) 26.

A non-exhaustive list of examples of suitable commercially available operating systems 26 is as follows: a Windows operating system from Microsoft Corporation, U.S.A., a Netware operating system available from Novell, Inc., U.S.A., an operating system available from IBM, Inc., U.S.A., any LINUX operating system available from many vendors or a UNIX operating system, which is available for purchase from many vendors, such as Hewlett-Packard Company, U.S.A., Sun Microsystems, Inc. and AT&T Corporation, U.S.A. The operating system 26 essentially controls the execution of other computer programs, such as the Login system 50, and provides scheduling, input-output control, file and data management, memory management, and communication control and related services.

The Login system 50 may be a source program, executable program (object code), script, or any other entity comprising a set of instructions to be performed. When a source program, then the program is usually translated via a compiler, assembler, interpreter, or the like, which may or may not be included within the memory 22, so as to operate properly in connection with the O/S 26. Furthermore, the Login system 50 can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, and Ada.

The I/O devices 23 may include input devices, for example but not limited to, a keyboard, mouse, scanner, microphone, etc. Furthermore, the I/O devices 23 may also include output devices, for example but not limited to, a printer, display, etc. Finally, the I/O devices 23 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 11 and/or 14, is a PC, workstation, or the like, the software in the memory 22 may further include a basic input output system (BIOS) (omitted for simplicity). The BIOS is a set of essential software routines that initialize and test hardware at startup, start the O/S 26, and support the transfer of data among the hardware devices. The BIOS is stored in ROM so that the BIOS can be executed when the computer 11 and/or 14 is activated.

When the computer 11 and/or 14 is in operation, the processor 21 is configured to execute software stored within the memory 22, to communicate data to and from the memory 22, and to generally control operations of the computer 11 and/or 14 pursuant to the software. The Login system 50 and the O/S 26 are read, in whole or in part, by the processor 21, perhaps buffered within the processor 21, and then executed.

Figure 3:
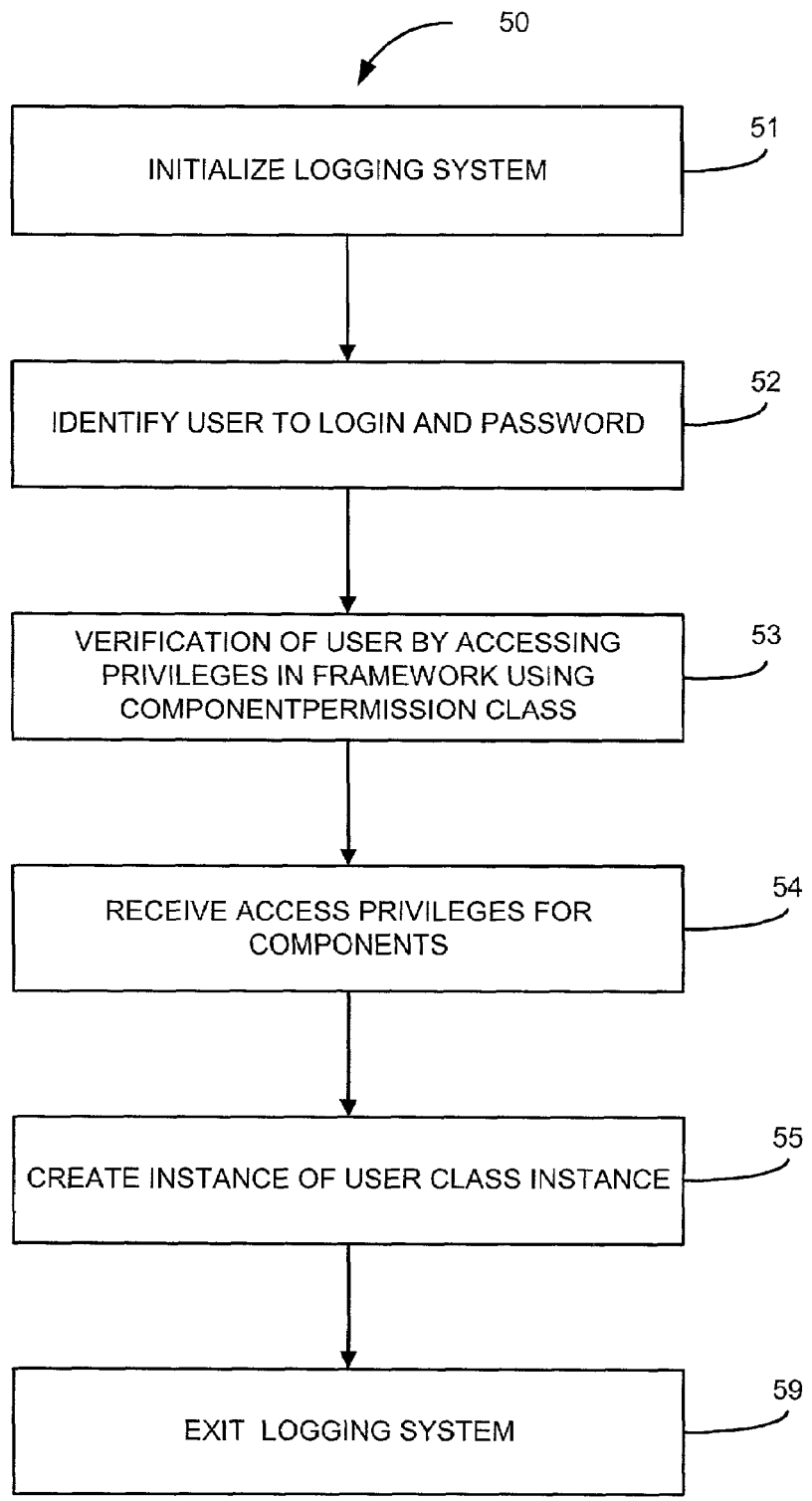
FIG. 3 is a flow chart illustrating an example of the process flow of the login system of the present invention, as shown in FIG. 2.

When the Login system 50 is implemented in software, as is shown in FIG. 3, it should be noted that the Login system 50 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The Login system 50 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

FIG. 3 is a data flow diagram illustrating an example of the process flow of the login system 50 of the present invention. The login system 50 provides security that is implemented in the component framework 27 (FIG. 2) using a number of security specific classes that allow definition of an access privilege for classes and attributes for users. The enforcement of the security definitions here is currently the responsibility of the clients. The component framework only allows the definition of the access privileges, but does not use them itself. The access privileges in the framework are defined on class and attribute levels, using the class "component permission" which is herein illustrated in FIG. 4.

Access privileges for components are assigned to instance of the "user" class where the system users are modeled. The "user" class is the fundamental security class in the component framework 27. It contains all the information about a user's name, description, and the default access permissions. Users are those clients that can access a server, and thus, can be end users, Internet users, or other components.

The login system 50 is initialized at step 51. At step 52, the login system identifies a user by login and password. At step 53, the login system 50 performs verification of the user by accessing privileges in the component framework 27 (FIG. 2) using the component permission class. The component permission class is herein illustrated with regard to FIG. 4.

At step 54, the login system receives access privilege for the components. At step 55, the login system 50 then creates an instance of a user/class instance for all the privileges for the user. The login system 90 then exits at step 59.

Figure 4:
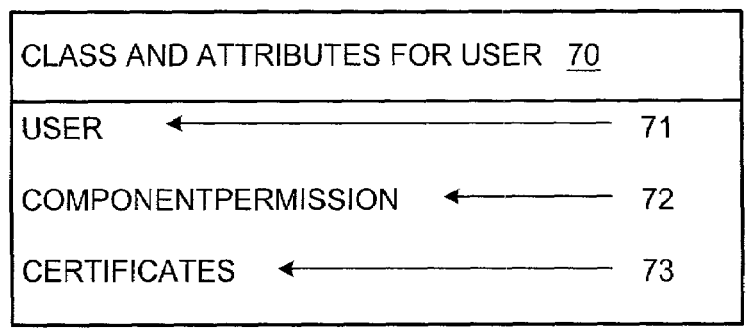
FIG. 4 is a block diagram illustrating the user and component classes, the class and attributes for a user, as shown in FIG. 3.

Illustrated in FIG. 4 is a block diagram illustrating the user and component classes, the class and attributes for a user.

The foregoing description has been presented for purposes of illustration and description. It is not intended to be exhaustive or to limit the invention to the precise forms disclosed. Modifications or variations are possible in light of the above teachings.

The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for securing login to a system, comprising:
    means for identifying a user to login;
    means for validating the user access privileges;
    means for allowing the user to enter the system if the user access privileges are valid;
    means for accessing user access privileges by using a components permission class that is located in a system framework; and
    means for receiving true user access privileges when the user is a valid user.

2. The system of claim 1 wherein said means for identifying further comprises:
    means for inputting the user name and password.

3. A method for securing login to a system, said method comprising the steps of:
    identifying a user to login;
    validating the user access privileges;
    allowing the user to enter the system if the user access privileges are valid;
    accessing user access privileges by using a components permission class located in a system framework; and
    receiving true user access privileges when the user is a valid user.

4. The method of claim 3 wherein said identifying step further comprises the step of:
    inputting the user name and password.

5. A computer readable medium for securing login to a system, comprising:
    logic for identifying a user to login;
    logic for validating the user access privileges;
    logic for allowing the user to enter the system if the user access privileges are valid;
    logic for accessing user access privileges by using a components permission class which is located in a system framework; and
    logic for receiving true user access privileges when the user is a valid user.

6. The computer readable medium of claim 5, wherein said logic for identifying further comprises:
    logic for inputting the user name and password.

7. A system for securing login to a system, comprising:
    an identifier that identifies a user to login;
    a validator that validates the user access privileges; and
    an entry mechanism that allows the user to enter the system if the user access privileges are valid;
    wherein said validator for accessing user access privileges uses a components permission class, which is located in a system framework; and
    further wherein said validator for accessing user access privileges receives true user access privileges when the user is a valid user.

8. The system of claim 7, wherein the identifier uses the user name and password to identify the user.

* * * * *